United States Patent
Prakash et al.

(10) Patent No.: US 11,158,209 B2
(45) Date of Patent: Oct. 26, 2021

(54) SYSTEMS AND METHODS FOR IDENTIFYING A COMBINATION OF PURCHASED ITEMS

(71) Applicant: MASTERCARD INTERNATIONAL INCORPORATED, Purchase, NY (US)

(72) Inventors: Mayank Prakash, Uttarakand (IN); Ashutosh Sharan, Gurgaon (IN); Sheetanshu Gupta, Jaipur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 234 days.

(21) Appl. No.: 16/409,557

(22) Filed: May 10, 2019

(65) Prior Publication Data
US 2019/0266916 A1  Aug. 29, 2019

Related U.S. Application Data

(63) Continuation of application No. 14/973,036, filed on Dec. 17, 2015, now Pat. No. 10,332,419.

(51) Int. Cl.
*G09B 19/00* (2006.01)
*G06Q 20/22* (2012.01)
*G06Q 50/12* (2012.01)

(52) U.S. Cl.
CPC ......... *G09B 19/0092* (2013.01); *G06Q 20/22* (2013.01); *G06Q 50/12* (2013.01)

(58) Field of Classification Search
CPC .... G06Q 40/12; G06Q 50/12; G06Q 10/0875; G06Q 20/22; G09B 19/0092
USPC .......................................................... 705/15
See application file for complete search history.

(56) References Cited

U.S. PATENT DOCUMENTS

| | | | |
|---|---|---|---|
| 8,626,796 B2 | 1/2014 | McBride et al. | |
| 2005/0049920 A1 | 3/2005 | Day et al. | |
| 2007/0055573 A1 | 3/2007 | Grell | |
| 2010/0280895 A1 | 11/2010 | Mottola | |
| 2013/0105565 A1 | 5/2013 | Kamprath | |
| 2013/0173338 A1 | 7/2013 | Briancon et al. | |
| 2014/0195556 A1 | 7/2014 | Fan | |
| 2015/0120378 A1 | 4/2015 | Arden | |
| 2015/0332414 A1 | 11/2015 | Unser et al. | |
| 2017/0039886 A1 | 2/2017 | Bitran et al. | |
| 2017/0124616 A1 | 5/2017 | Lee et al. | |

*Primary Examiner* — Allen C Chein
*Assistant Examiner* — Denisse Y Ortiz Roman
(74) *Attorney, Agent, or Firm* — Armstrong Teasdale LLP

(57) ABSTRACT

A system and method for identifying items purchased at a merchant is provided. The method includes receiving transaction data associated with a transaction of the consumer, the transaction data including a transaction amount and a merchant identifier associated with the merchant. Price information and tax information associated with the merchant are retrieved. A most likely item combination is selected based on a pre-tax total for the transaction and the price information.

16 Claims, 8 Drawing Sheets

| FOOD | SERVING | PROT | CARB | FAT | PTS | CALS | PRICE | PROTEIN/$ | CARB/$ | FAT/$ | PTS/$ | CALS/$ |
|---|---|---|---|---|---|---|---|---|---|---|---|---|
| HAMBURGER | 4.1 OZ | 12 | 33 | 9 | 6 | 280 | $3.28 | 3.6 | 10.0 | 2.7 | 1.8 | 85.4 |
| CHEESEBURGER | 4.6 OZ | 14 | 35 | 12 | 7 | 250 | $3.10 | 4.5 | 11.3 | 3.9 | 2.2 | 80.6 |
| FISH | 6 OZ | 13 | 25 | 17 | 9.5 | 300 | $4.05 | 3.2 | 6.2 | 4.2 | 2.3 | 74.1 |
| CHICKEN | 5.8 OZ | 15 | 41 | 9 | 9 | 325 | $4.59 | 3.3 | 8.9 | 2.0 | 2.0 | 70.8 |
| GRILLED SANDWICH | 5.5 OZ | 14 | 35 | 14 | 8 | 290 | $2.50 | 5.6 | 14.0 | 5.6 | 3.2 | 116.0 |

FIG. 6

SYSTEMS AND METHODS FOR IDENTIFYING A COMBINATION OF PURCHASED ITEMS

CROSS REFERENCE TO RELATED APPLICATIONS

This application is a continuation application of U.S. patent application Ser. No. 14/973,036, filed Dec. 17, 2015, which is hereby incorporated by reference in its entirety.

BACKGROUND OF THE DISCLOSURE

The field of the invention relates generally to calculating and tracking nutritional information of food consumed by a consumer, and, more specifically, to network-based systems and methods for calculating and tracking nutritional information for food purchased by the consumer.

Consumers are increasingly health conscious. For example, consumers want to know how their food intake affects their health and fitness goals, and thus, in many cases, they are particularly interested in the nutritional value of the food they consume. In addition, consumers are using a variety of devices and services to track and improve their activity levels. For example, some consumers use "fitness wearables" that use accelerometers, GPS tracking, and other technology to track the physical activity of the user of the wearable. Such wearables make it simple and convenient for users to track their exercise and other physical activity.

Other consumers may use various "diary"-style services or programs, in which the user manually logs their physical activity by activity type and duration of the activity. Such diary-style services may be time consuming, and they require the user either to remember all of their activity performed over the course of a day, or to constantly update their activity log throughout the day, which can be tedious and/or inconvenient for many users. Unfortunately, these known systems also require the user to manually track their food consumption. In these known systems, the user must enter each and every food item they consume in a particular meal or particular day, including the amount of each food consumed, which can be a difficult task to complete accurately. As a result, many users over- or underestimate their consumption, and many users get tired of the tedious task of entering food into their "food diary," which may lead the user to abandon the task entirely. This issue may be particularly relevant to users when they eat out at restaurants, where it may be difficult to know, let alone track, the ingredients and amounts of those ingredients that go into a meal. Even when nutritional information about a meal purchased at a restaurant is available, for example posted on a web site of the restaurant, a patron must still remember to manually enter the information into the "diary"-style service or program and expend time and effort in doing so.

Accordingly, it is desired to have a system that will automatically calculate the caloric intake and other nutritional values of a consumer including when the consumer is eating at a restaurant.

BRIEF DESCRIPTION OF THE DISCLOSURE

In one aspect, a method for retrieving nutritional information for a consumer using a health tracking (HT) computing device is provided. The method includes receiving transaction data associated with a transaction of the consumer. The transaction data includes a transaction amount and a merchant identifier associated with a food merchant. The method further includes identifying a set of possible food order combinations associated with the food merchant totaling the transaction amount. The method also includes selecting a food order combination associated with the transaction from the set of possible food order combinations. The method further includes determining nutritional information associated with each food item in the selected food order combination. The method also includes outputting the determined nutritional information to a user client system associated with the consumer.

In another aspect, a health tracking (HT) computing device used for tracking nutritional information associated with a consumer is provided. The HT computing device includes a processor and a memory coupled to the processor. The processor is configured to receive transaction data associated with a transaction of the consumer. The transaction data includes a transaction amount and a merchant identifier associated with a food merchant. The processor is further configured to identify a set of possible food order combinations associated with the food merchant totaling the transaction amount, select a food order combination associated with the transaction from the set of possible food order combinations, determine nutritional information associated with each food item in the selected food order combination, and output the determined nutritional information to a user client device associated with the consumer.

In a further aspect, a computer-readable storage media having computer-executable instructions embodied thereon is provided. When executed by at least one processor associated with health tracking (HT) computing device, the computer-executable instructions cause the processor to receive transaction data associated with a transaction of the consumer. The transaction data includes a transaction amount and a merchant identifier associated with a food merchant. The computer-executable instructions further cause the processor to identify a set of possible food order combinations associated with the food merchant totaling the transaction amount, select a food order combination associated with the transaction from the set of possible food order combinations, determine nutritional information associated with each food item in the selected food order combination, and cause the processor to output the determined nutritional information to a user client device associated with the consumer.

BRIEF DESCRIPTION OF THE DRAWINGS

FIGS. 1-8 show example embodiments of the methods and systems described herein.

FIG. 1 is a schematic diagram illustrating an example multi-party payment card system for enabling payment-by-card transactions with a health tracking (HT) computing device for calculating nutritional information of food purchases, and tracking nutritional information for a consumer in accordance with one embodiment of the present disclosure.

FIG. 2 is an expanded block diagram of an example embodiment of an HT platform including the HT computing device shown in FIG. 1.

FIG. 3 illustrates an example configuration of a server system such as the HT computing device shown in FIGS. 1 and 2.

FIG. 4 illustrates an example configuration of a client system shown in FIG. 2.

FIG. 5 is a data flow diagram showing the flow of data within the HT platform of FIG. 2 including calculation and tracking nutritional information for a consumer using purchase data.

FIG. 6 is a simplified chart illustrating data entries in an example menu information database for a merchant used by the HT computing device of FIG. 2.

FIG. 7 is a simplified diagram of an example method for calculating and tracking nutritional information using the HT computing device of FIG. 2.

FIG. 8 is a diagram of components of one or more example computing devices that may be used in the environment shown in FIG. 2.

DETAILED DESCRIPTION OF THE DISCLOSURE

Figure 1:
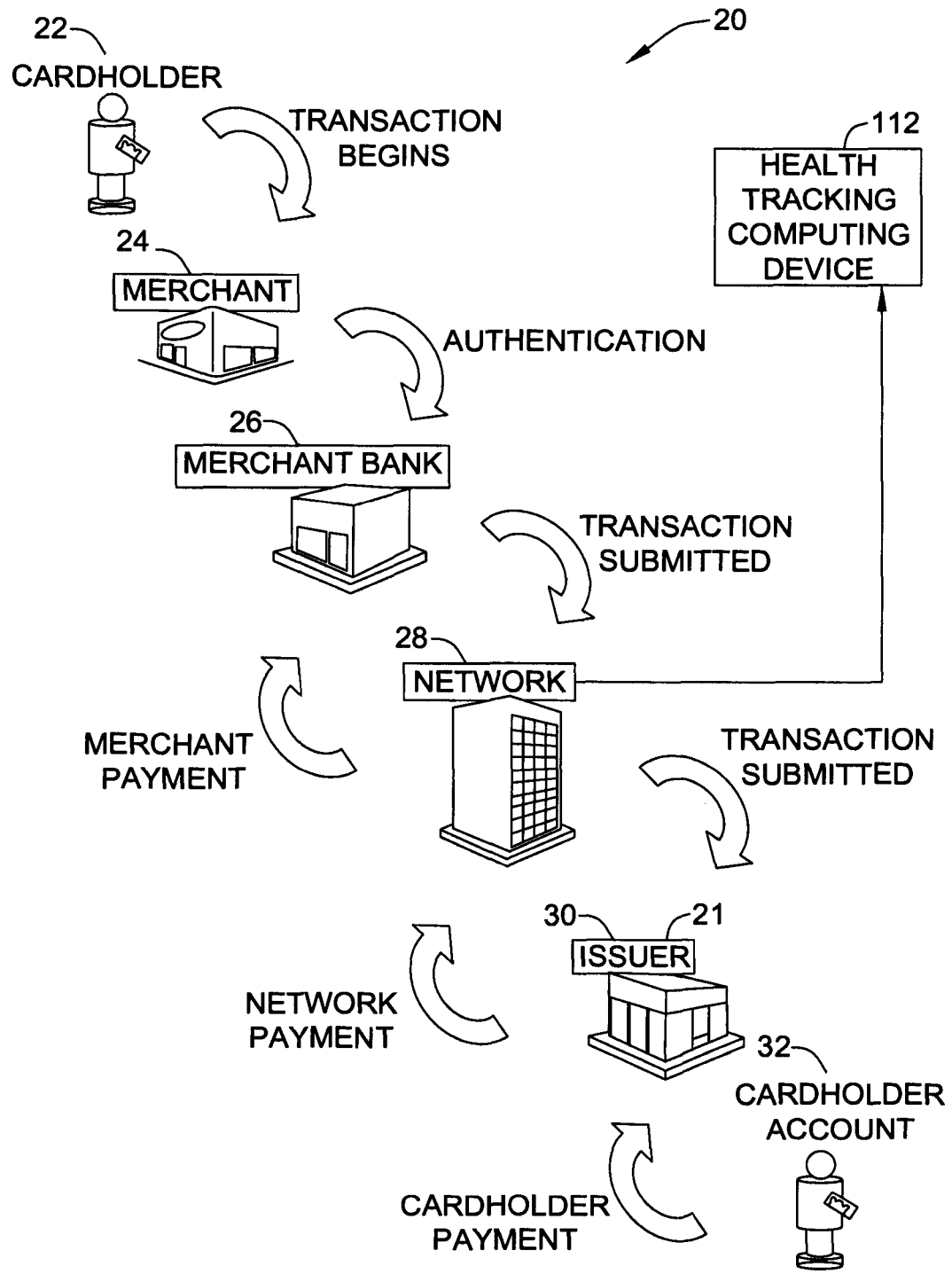

The systems and methods described herein include a health tracking (HT) computing device that is configured to automatically track nutritional information of meals purchased by a consumer, who is also a payment cardholder, based on transaction data associated with the purchase. The HT computing device includes a processor in communication with a memory. The HT computing device is also in communication with a payment processing network or a database for storing payment processing data. In the example embodiment, the consumer uses a payment card to purchase food at, for example, a restaurant. Transaction data resulting from the purchase is transmitted to the HT computing device where the nutritional information associated with the purchased food is retrieved from the transaction data. The HT computing device is configured to analyze the transaction data, determine the merchant/restaurant where the transaction was initiated, retrieve menu data stored for that particular merchant, and determine from the menu data and the transaction data the particular menu items purchased by the cardholder. Once the HT computing device determines the food purchased, and presumably consumed by the cardholder, the HT computing device is able to retrieve nutritional information stored for the menu items purchased, and then calculate the nutritional intake of the cardholder/consumer. The HT computing device is also in communication with activity monitoring devices so that it is able to account for both food intake and activity performed by the consumer in determining the net nutritional information for the consumer.

Consumer/cardholders (e.g., an entity using a payment card such as a credit card, debit card, or a prepaid card) initiate payment transactions to pay for purchases from merchants. Signals including transaction data associated with these payment transactions are received and processed over the payment processing network. The transaction data may include data identifying the cardholder and the merchant, an approximate merchant location (e.g., an address of the merchant), a timestamp associated with the transaction, a transaction amount, and/or other data.

In the example embodiment, the HT computing device is configured to receive a plurality of signals including a plurality of transaction data from the payment processing processor. For example, the payment processing network may be a processing network configured to process payment card transactions initiated by cardholders of payment cards. The HT computing device identifies a candidate signal from the plurality of signals as corresponding to a transaction initiated by the payment cardholder, wherein the candidate signal identified is based on a cardholder identification included in the transaction data of the candidate signal. The transaction data of the candidate signal includes a merchant identifier corresponding to a restaurant. The HT computing device retrieves, from the transaction data of the candidate signal, the merchant identifier, a merchant location, and a transaction amount.

Based on the received transaction data, the HT computing device determines the nutritional information of food purchased by the consumer using the payment card. The HT computing device is configured to identify consumer transactions with food merchants, and to determine the items purchased and the nutritional value of the items purchased. The nutritional value of the items purchased is stored in a database and associated with the consumer such that purchases over time may be tracked. This information can be provided to an application running on a client device (the consumer's laptop, tablet, smart phone, wearable device, etc.) and/or be used to generate analytics information which is provided to the consumer. The HT computing device may be further configured to provide recommendations to the consumer based on available nutritional information.

The HT computing device compares the transaction amount to a set of possible food order combinations totaling the transaction amount. The set of possible food order combinations are based on the merchant location and menu information, wherein the menu information includes the price and nutritional information associated with each food item available for purchase. The HT computing device selects a food order combination from the set of possible food order combinations having a total price that matches the transaction amount. The HT computing device retrieves the nutritional information associated with each food item in the selected food order combination, and stores the nutritional information associated with each food item in the selected food order combination in a database. The nutritional information is then associated with the cardholder/consumer.

In some embodiments, the HT computing device selects a food order combination from the set of possible food order combinations by determining that the transaction amount corresponds to only one possible food order combination and selecting the one possible food order combination.

In alternative embodiments, the HT computing device selects a food order combination from the set of possible food order combinations by determining that the transaction amount corresponds to a plurality of possible food order combinations, and determining—through a comparison of the transaction amount to previously selected food order combinations having a same or similar transaction amount that the payment cardholder has previously purchased in the past—one of the plurality of possible food order combinations. The HT computing device selects the one of the plurality of possible food order combinations purchased in the past more frequently than other possible food order combinations.

In a further embodiment, the HT computing device selects a food order combination from the set of possible food order combinations by transmitting a prompt to a user client system associated with the payment cardholder, the prompt presenting the plurality of possible food order combinations. The prompt triggers the payment cardholder to select one of the plurality of possible food order combinations. The HT computing device receives from the user client system an indication of the selected food order combination. In some embodiments, the prompt includes one of the plurality of possible food order combinations purchased in the past more frequently than other possible food order combinations.

In a still further embodiment, when determining that the transaction amount corresponds to a plurality of possible food order combinations, the HT computing device selects a food order combination from the set of possible food order combinations by determining, through a comparison of the transaction amount to previously selected food order combinations having a same transaction amount, whether the cardholder has or has not previously purchased one of the plurality of possible food order combinations in the past. If so, the HT computing device will either select the food order combination that has been purchased in the past or rule out the food order combination that has not been purchased in the past.

In some embodiments, the HT computing device compares the transaction amount of the selected signal to an average transaction amount associated with the merchant identifier and the merchant location. If it is determined that the transaction amount exceeds the average transaction amount by a predetermined value, the HT computing device transmits a prompt to a user client device associated with the cardholder presenting each food item in the selected order combination. The payment cardholder is prompted to assign each food item to one or more profiles of one or more users associated with the cardholder. The HT computing device receives the assignments for each food item from the user client device, and stores the nutritional information associated with each assigned food item in the database, where the nutritional information of each assigned food item associated with the corresponding assigned profile.

In one or more embodiments, the HT computing device transmits the nutritional information associated with each food item to an application running on a user client system. In the exemplary embodiment, the HT computing device generates analytics information based on the stored nutritional information in the database associated with the payment cardholder, and transmits the analytics information to an application running on a user client system.

In additional embodiments, the HT computing device generates, based on the stored nutritional information in the database associated with the payment cardholder, a recommendation for healthier food items available at one or more merchants. The HT computing device transmits the recommendation to an application running on a user client system. In further embodiment, the HT computing device receives location information from the application running on the user client system and the one or more recommendations are generated based on the location information, including nearby merchants.

As explained in greater detail below, the HT computing device identifies transaction signals and/or transaction data associated with a consumer and with a food purchase using consumer identification information (e.g., received in the Enrollment Phase) and with transaction data identifying the type of merchant. Using the transaction data and menu information corresponding to the merchant identified by the transaction data, the HT computing device determines which food items were purchased by the consumer in the transaction and calculates the associated nutritional information as described in greater detail with reference to the Calculation Phase. The calculated nutritional information is stored and tracked by the HT computing device as described in greater detail with reference to the Tracking Phase.

Enrollment Phase

In some embodiments, the HT computing device maintains the database of cardholder identifiers for cardholders participating in nutritional value tracking based on received enrollment requests. For example, the HT computing device may receive an enrollment request from a client device associated with a cardholder/consumer. This request may be generated using an application or other program running on a client device/user client system in communication with the HT computing device. The enrollment request includes at least one cardholder identifier. Upon receiving the request, the cardholder identifier is added to the database of cardholder identifiers for cardholders participating in nutritional value tracking.

Data Acquisition Phase

To determine the nutritional value of food purchased by the cardholder, the HT computing device receives a plurality of transaction signals, wherein each transaction signal includes transaction data. The transaction data includes a cardholder identifier (e.g., a primary account number (PAN), payment card number, cardholder name, cardholder address, etc.). The HT computing device determines if a transaction signal of the plurality of received transaction signals includes a cardholder identifier corresponding to a cardholder for whom the HT computing device is tracking the nutritional value of food purchases. For example, the HT computing device maintains a database of cardholder identifiers for cardholders participating in nutritional value tracking and compares cardholder identifiers in received transaction signals to this database. Upon identifying a match, the corresponding transaction signal is identified as a candidate signal. The candidate signal corresponds to a purchase made by a cardholder for whom the HT computing device is tracking the nutritional value of food purchases.

Upon identifying a candidate signal corresponding to a purchase made by a cardholder for whom the HT computing device is tracking the nutritional value of food purchases (e.g., an enrolled cardholder), the HT computing device determines whether to select the candidate signal. The HT computing device selects a candidate signal if the candidate signal further corresponds to a food purchase, such as a transaction corresponding to a purchase made at a restaurant or other food merchant. The HT computing device retrieves a merchant identifier included in the transaction data of the candidate signal. The HT computing device compares the retrieved merchant identifier to a database of merchant information inducing merchant identifiers. The HT computing device retrieves merchant information from the database corresponding to a merchant identifier which matches the merchant identifier included in the transaction data of the candidate signal. Based on the retrieved merchant information (e.g., merchant name, a merchant category code (MCC), etc.), the HT computing device determines if the candidate signal corresponds with a food purchase made at a restaurant or other food merchant. For example, the MCC, merchant name, or other merchant information may indicate that the merchant of the candidate signal is a restaurant or other food merchant. If the HT computing device determines that the candidate signal corresponds with a food purchase made at a restaurant or other food merchant, the candidate signal is selected.

Calculation Phase

Upon selecting a signal, the HT computing device retrieves from the transaction data of the selected signal a transaction amount and a merchant location. Using the merchant identifier(s), transaction amount, and/or merchant location, the HT computing device determines food item(s) purchased in the transaction. The HT computing device uses the merchant identifier(s) and/or merchant location to retrieve menu information corresponding to the merchant, including food items available for purchase and their corresponding price. The merchant location allows the HT computing device to factor in geographic pricing differences among a single merchant (e.g., a restaurant chain). The HT computing device retrieves menu information corresponding to the merchant for the geographic area in which the merchant is located. This also allows the HT computing device to account for variations in local sales tax, as the menu information is updated to account for sales tax for each geographic area. Alternatively, the HT computing device may retrieve from an additional database (e.g., an external source such as a server including the database) sales tax information for the merchant by querying the database using geographic information associated with the merchant (e.g., a merchant address or other information identifying the location of the merchant).

The menu information and corresponding prices of food items available for purchase may be retrieved from a database maintained by the HT computing device. For example, the HT computing device may maintain information for each restaurant or other food merchant. In alternative embodiments, the HT computing device uses the merchant identifier(s) and merchant location to query a remote database. For example, the HT computing device may use an Internet connection to query a database or website maintained by the merchant to retrieve menu information including the price of each food item available for sale.

Using the retrieved price information for each food item available for sale, the HT computing device compares the transaction amount to a set of possible food order combinations which total the transaction amount. In some embodiments, the HT computing device uses the known transaction amount to determine which sets of food items have a total price equal to the transaction amount. In an alternative embodiment, the HT computing device maintains a database of all possible combinations of food items below a certain threshold total price. The HT computing device compares the transaction price to the total price of each possible combination and retrieves matching combinations. The HT computing device may utilize other information in determining the set of possible food order combinations to account for differences between the price as listed on a merchant menu and/or the listed price plus sales tax and the actual price paid in the transaction between the cardholder and the merchant. For example, the HT computing device may account for discounts of coupons by querying an additional database of ongoing promotions associated with the merchant. The additional database may be a remote database (e.g., a third party database) that the HT computing device queries using, for example, the merchant name and geographic information specifying the location of the merchant. The HT computing device receives promotion information which indicates how ongoing promotions affect the price of each menu item. The HT computing device uses this information to update the database of menu items and their associated costs. In further embodiments, the HT computing device solicits (e.g., using an application running on a user device) information regarding promotions, discounts, coupons, an amount tipped, and/or other information which may affect the amount of the transaction with the merchant. The HT computing device uses the price information for each menu item and the other information which may affect the transaction amount (e.g., sales tax information, promotion information, tip information, etc.) to determine possible food order combinations which total the transaction amount.

If the HT computing device only returns one possible food order combination, this food order combination is selected. If more than one possible food order combination is returned, the HT computing device determines if prior food order information associated with both the cardholder and the merchant is available. If prior food order information is available, the HT computing device uses the prior food order information to preliminarily select one of the possible food order combinations returned. For example, the HT computing device may have information stored in the database regarding the cardholder's previous purchases from the merchant. The HT computing device compares the transaction amount to transaction amounts of previous purchases. The combination of food items of prior purchases having the same transaction amount are analyzed to determine if one combination occurs more frequently than the others. This more commonly purchased food order combination is preliminarily selected as the food order combination corresponding to the transaction being processed by the HT computing device. Additionally, the HT computing device may preliminarily select the previously purchased food order combination if the transaction amounts match. Furthermore, the HT computing device may preliminarily select a food order combination based on data corresponding to a plurality of customers (e.g., which of the possible food order combinations is most frequently purchased).

Upon preliminarily selecting a food order combination, the HT computing device transmits a prompt to a user client device. For example, the HT computing device transmits an instruction which causes an application running on the user client device to display the prompt. The prompt identifies the preliminarily selected food order combination and the alternative food order combinations returned by the HT computing device and prompts the cardholder to confirm the preliminarily selected food order combination is correct or select from the alternative food order combinations. The HT computing device receives the selection from the cardholder via communication with the user client device. The received selection is identified by the HT computing device as the selected food order combination.

In alternative embodiments, the HT computing device does not prompt the cardholder. Rather, the HT computing device selects the food order combination based on the prior food order information and/or other information. For example, the HT computing device may take into account which of the possible food order combinations is most likely to be ordered by all customers of the merchant based on prior transaction data associated with the merchant and other cardholders. In further embodiments, these factors may be used in selecting the preliminary food order combination which is presented to the cardholder via the prompt as previously described.

If prior food order information is not available and the HT computing device has returned multiple possible food order combinations, the HT computing device may prompt the cardholder to select from a list of possible food order combinations. For example, the HT computing device transmits an instruction which causes an application running on the user client device to display the prompt. The prompt identifies the possible food order combinations returned by the HT computing device and prompts the cardholder to select from the alternative food order combinations. The HT computing device receives the selection from the cardholder via communication with the user client device. The received selection is identified by the HT computing device as the selected food order combination.

In some embodiments, the possible food order combinations included in the prompt may be a subset of all the possible food order combinations returned by the HT computing device. The subset selected for inclusion in the prompt may be determined using one or more of the techniques previously described herein. For example, the HT computing device may use transaction data and food item purchase data corresponding to a plurality of cardholders to eliminate unlikely possible food combinations from inclusion in the prompt.

Using the selected food order combination, the HT computing device retrieves nutritional information corresponding to each food item in the selected food order combination. For example, the HT computing device queries a local database (e.g., maintained by the HT computing device) or a remote database (e.g., maintained by the merchant) with identifiers of the food items in the selected food order combination. The HT computing device receives corresponding nutritional information from the database. Nutritional information may include calorie content, fat content, protein content, sugar content, and/or other nutritional information. In some embodiments, the nutritional information may be broken down by a standard currency unit. For example, a food item may have nutritional information including calories per dollar for the price of the food item.

Tracking Phase

The received nutritional information is stored in a database by the HT computing device in one or more entries corresponding to the cardholder. In some embodiments, the nutritional information for the entire food order is stored as a single entry. In other embodiments, the nutritional information is broken down by corresponding food item. The HT computing device may store additional information with the nutritional information in the database. For example, the nutritional information may be stored with an identifier of the merchant, a transaction data timestamp, and/or other information. The nutritional information and/or additional information may allow the HT computing device, or a user client device to which the information is provided, to track the eating habits of the cardholder and/or otherwise generate analytics based on the information. For example, transaction timestamp data may allow the HT computing device to identify a meal for which the food items were purchased, the time between food consumption, restaurants which the cardholder frequents most often, and/or generate other information. This information may be used to provide recommendations. For example, the HT computing device may recommend that the cardholder eat a more nutritious breakfast based on historic calorie consumption at breakfast identified by food items purchased in transactions having a timestamp between 5 AM and 10:30 AM.

In some embodiments, the HT computing device determines that a transaction amount for a selected signal likely corresponds to a food purchase made by the cardholder for more than one person. For example, the HT computing device may compare the transaction amount to an average transaction amount associated with the merchant identified in the transaction data of the selected signal. If the transaction amount exceeds the average transaction amount by a predetermined value (e.g., 30 percent, a fixed currency amount such as 20 dollars, etc.), the HT computing device determines that the purchase was likely for multiple people. The predetermined value may be merchant specific. For example, the predetermined value may change depending on the average transaction amount for the merchant (e.g., be higher for a merchant with a high average transaction amount).

Upon determining that the selected signal likely corresponds to a food purchase made by the cardholder for more than one person, the HT computing device prompts the user. The prompt includes the food items included in the selected food order combination and prompts the cardholder to select which food items were consumed by the cardholder. In some embodiments, this prompt follows a previous prompt of the type described herein to select from multiple possible food order combinations.

In further embodiments, the prompt corresponding to a food purchase for more than one person includes a prompt for the cardholder to assign each food item to one or more profiles. The cardholder defines profiles for which the HT computing device tracks food purchases. For example, when a cardholder enrolls with the HT computing device, the cardholder may set up profiles for individuals for whom the cardholder purchases food (e.g., spouses, significant others, children, friends, etc.). The prompt includes each food item and allows the cardholder to assign each food item to a profile or to leave the food item unassigned (e.g., in the case in which the food item was not purchased for a person with an assigned profile). The HT computing device tracks food items and nutritional information for each profile as described herein. In some embodiments, the HT computing device automatically assigns food items to each profile and the prompt asks the cardholder to confirm the assignment or make changes. The HT computing device may automatically assign food items to profiles based on historic information for that merchant indicating how food items have been assigned for past transactions.

Similar prompting techniques may be used by the HT computing device to acquire other information which may affect the transaction amount (e.g., sales tax information, promotion information, tip information, etc.) to determine possible food order combinations which total the transaction amount. For example, after each transaction the HT computing device may present a prompt which indicates nutritional information associated with the transaction including an identification of the food items purchased. The prompt may further ask the cardholder to specify information such as coupons used or an amount tipped if the indicated food items are not the food items purchased by the cardholder in the transaction. Using the additional information received in response to the prompt, the HT computing device may update the nutritional information and present the information to the cardholder in a further prompt.

In alternative embodiments, the transaction data includes stockkeeping unit ("SKU") data which identifies the food items purchased by the cardholder. Using the SKU data, the HT computing device identifies the food items purchased by the cardholder and retrieves the corresponding nutritional information from the database. The nutritional information and/or corresponding food items purchased are stored in a database maintained by the HT computing device in an association with the cardholder.

In some embodiments, the HT computing device outputs nutritional information, recommendations, and/or analytics to an application associated with the HT computing device running on a user client system or to a web server associated with the HT computing device. In alternative embodiments, the HT computing device outputs nutritional information, recommendations, and/or analytics to a third party application, user client system, or service. The HT computing device may further receive additional health information from third party applications or user client systems of the cardholder. For example, the HT computing device may receive activity information (e.g., calories burned in a day) from an activity tracker. The HT computing device may also receive information such as a location of the cardholder from a user client system of the cardholder. The HT computing device may use received information in tracking the health of the cardholder and/or providing recommendations to the cardholder. For example, the HT computing device may recommend a healthy dinner option to the cardholder when the cardholder has not exercised earlier in the day. The recommendations provided by the HT computing device may be location specific based on the received location of the cardholder. For example, the HT computing device may provide a recommendation for a healthy restaurant near the current location of the cardholder. In some further embodiments, the HT computing device may provide recommendations based on a goal input by the cardholder received from a client user device. For example, the cardholder may provide an input requesting a recommendation for a nearby restaurant at which the cardholder can purchase a meal having the highest protein per dollar cost value. The HT computing device uses menu information corresponding to nearby restaurants, identified based on received location data, to determine which restaurant has food items with the highest protein per dollar cost value.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The technical effects of the systems and methods described herein include at least one of (a) automatically tracking nutritional information of meals purchased by a cardholder; (b) identifying a signal corresponding to a purchase made by a cardholder for whom the nutritional information of food purchases is being tracked; (c) identifying transactions corresponding to a purchase made at a restaurant or other food merchant; (d) determining that the transaction amount corresponds to one or more possible food order combination and selecting the one possible food order combination; and (e) generating, based on stored nutritional information in the database associated with the cardholder, a recommendation for healthier food items.

FIG. 1 is a schematic diagram illustrating an example multi-party payment card system 20 for enabling payment-by-card transactions along with a health tracking (HT) computing device for calculating nutritional information of food purchases, and tracking nutritional information for a consumer in accordance with one embodiment of the present disclosure. FIG. 1 depicts a flow of data in a typical financial transaction through system 20, which includes the HT computing device 112. Components of system 20 provide HT computing device 112 with transaction data, which HT computing device 112 processes to automatically track nutritional information of meals purchased by a cardholder/consumer, and provide the data on a user interface.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are customers of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard networks, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information and/or transaction information such as a type of merchant, amount of purchase, date of purchase, and/or other information in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including HT computing device 112. In the example embodiment, interchange network 28 provides such transaction data and additional transaction data to HT computing device 112. In alternative embodiments, any party may provide such data to HT computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In one embodiment, HT computing device 112 is part of interchange network 28. HT computing device 112 may, for example, receive and process signals, including transaction data sent between other parties of interchange network 28 such as issuer banks 30 and merchant banks 26. In another embodiment, HT computing device 112 is a separate device in communication with interchange network 28 such that HT computing device 112 receives signals, including transaction data, from interchange network 28.

Figure 2:
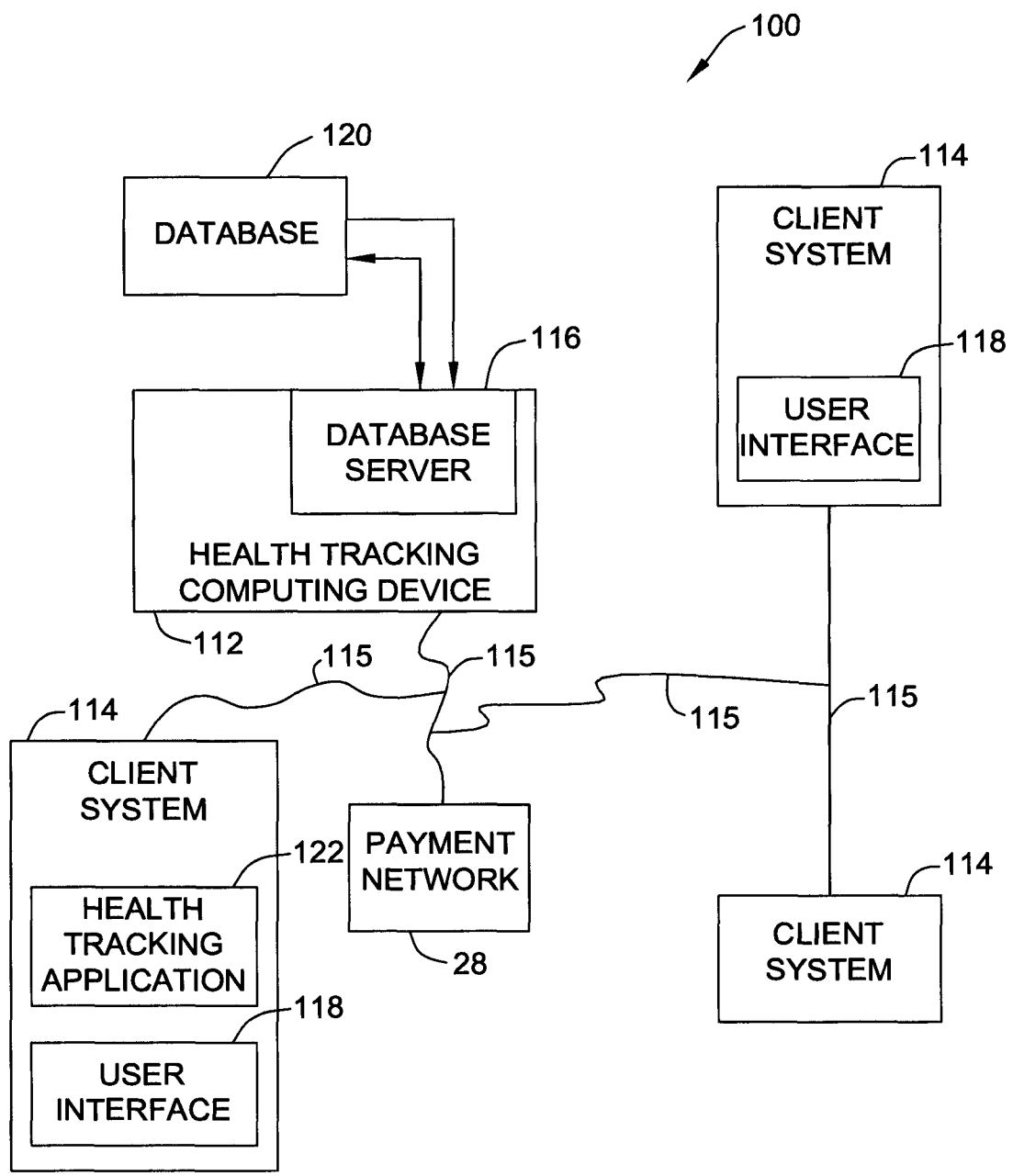

FIG. 2 is an expanded block diagram of an example embodiment of a health tracking platform 100 used in processing payment transactions that includes HT (health tracking) computing device 112 in accordance with one example embodiment of the present disclosure. In the example embodiment, platform 100 is used for tracking food consumption data for a consumer, who is also a cardholder, as described herein.

More specifically, in the example embodiment, platform 100 includes a HT computing device 112, and a plurality of client sub-systems, also referred to as client systems 114, connected to HT computing device 112. In one embodiment, client systems 114 are computers including a web browser, such that HT computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. HT computing device 112 is also in communication with interchange network 28 using network 115. Further, client systems 114 may additionally communicate with interchange using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on HT computing device 112 and can be accessed by potential users at one of client systems 114 by logging onto HT computing device 112 through one of client systems 114. Access to centralized database 120 is controlled by HT computing device 112 to limit the display of data to authorized users enrolled with HT computing device 112. In an alternative embodiment, database 120 is stored remotely from HT computing device 112 and may be non-centralized. Database 120 may be a database configured to store information used by HT computing device 112 including, for example, transaction data, nutritional information, user data, merchant identifiers, merchant locations, transaction amounts, menu information (including, but not limited to, the price and nutritional information associated with each food item available for purchase), sets of possible food order combinations, analytics information, merchant recommendations, a database of user login information, and/or other data.

Database 120 may include a single database having separated sections or partitions, or may include multiple databases, each being separate from each other. In some embodiments, database 120 stores transaction data generated over the processing network including data relating to merchants, consumers, account holders, prospective customers, issuers, acquirers, and/or purchases made. In additional embodiments, database 120 also stores account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., a consumer or any other end user). In the example embodiment, one of client systems 114 includes a user interface 118. For example, user interface 118 may include a graphical user interface with interactive functionality, such that nutritional information, recommendations, and/or analytics, transmitted from HT computing device 112 to client system 114, may be shown in a graphical format. A user of client system 114 may interact with user interface 118 to view, explore, and otherwise interact with the nutritional information, recommendations, and/or analytics. HT computing device 112 may be associated with interchange network 28 and/or may process transaction data. Client systems 114 may additionally or alternatively be associated with a user who enrolls with HT computing device 112. In cases where the user enrolls others with HT computing device 112, the user may be referred to as an administrative user.

Such a remote computing device or client system 114 includes user interface 118 for entering information by a user. User interface 118 is also used, for example, to receive a prompt and/or select a food order combination. In some embodiments, client system 114 may include HT (health tracking) application 122. HT application 122 may be, for example, a program or application that runs on client system 114.

In some embodiments, HT computing device 112 further includes an enrollment component for enrolling users with HT computing device 112. Enrollment data (e.g., initial username, initial password, cardholder information, etc.) is transmitted by client system 114 to HT computing device 112. For example, a user may access a webpage hosted by HT computing device 112 and access an application running on client system 114 to generate enrollment login information (e.g., username and password) and transmit the enrollment information to HT computing device 112. HT application 122 stores the received login information data in a database of login information (e.g., in database 120). In some embodiments, HT application 122 may display a log-in page for receiving initial login information. HT application 122 compares the candidate login information to the database of login information and determines if the candidate login information (e.g., username and password) matches the login information data stored in the database of login information.

In alternative embodiments, HT application 122 is accessed remotely by client system 114. HT application 122 may be hosted by or stored on HT computing device 112 and accessed by client system 114. For example, HT application 122 may be stored on and executed by HT computing device 112. Client system 114 may provide inputs to HT computing device 112 via network 115 which are used by HT computing device 112 to execute HT application 122. In one embodiment, these inputs may be received by a website hosted by HT computing device 112. The website may further provide output to client system 114. The client system 114 used by the user has access to a website (e.g., hosted by HT computing device 112), application (e.g., HT application 122), or other tool which the user uses to view nutritional information, recommendations, and/or analytics provided by HT computing device 112 to the user.

Figure 3:
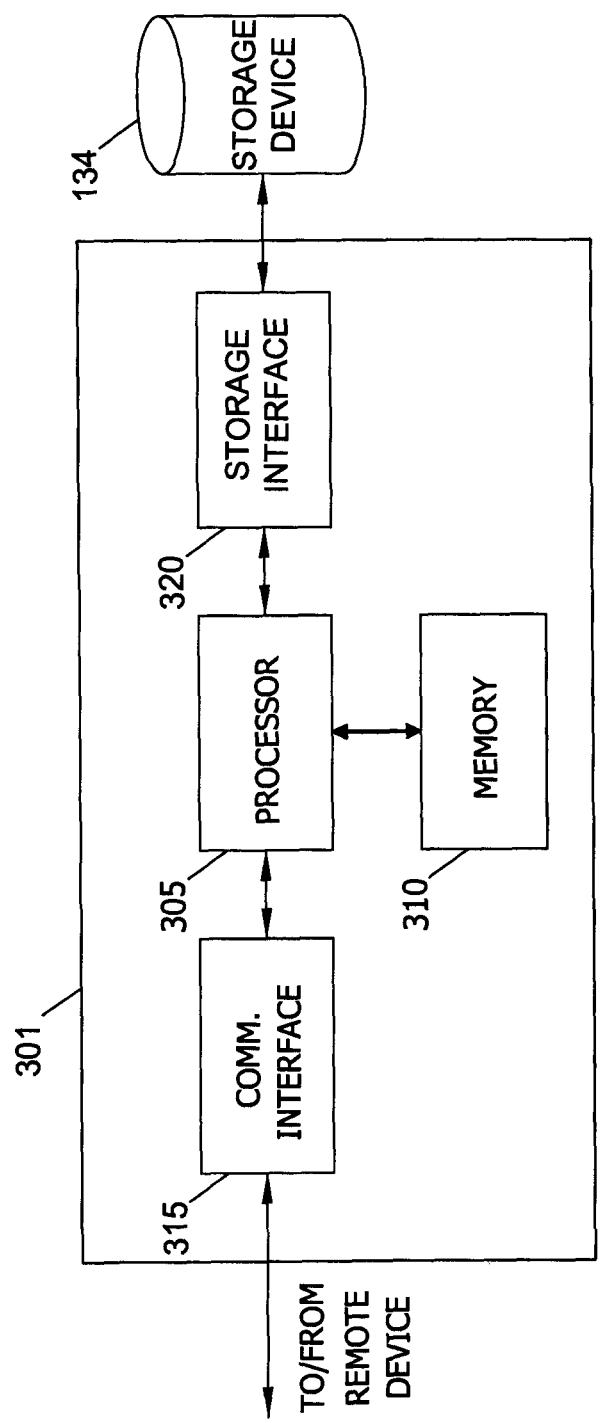

FIG. 3 illustrates an example configuration of a server (host computing device) system 301 such as HT computing device 112 (shown in FIG. 2) used to receive transaction data, determine food order combinations from transaction amounts, generate nutritional information, recommendations, analytics, or other data, and to present the data on an interactive user interface, in accordance with one example embodiment of the present disclosure.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display analytics and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system. In some embodiments, server system 301 also includes database server 116.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
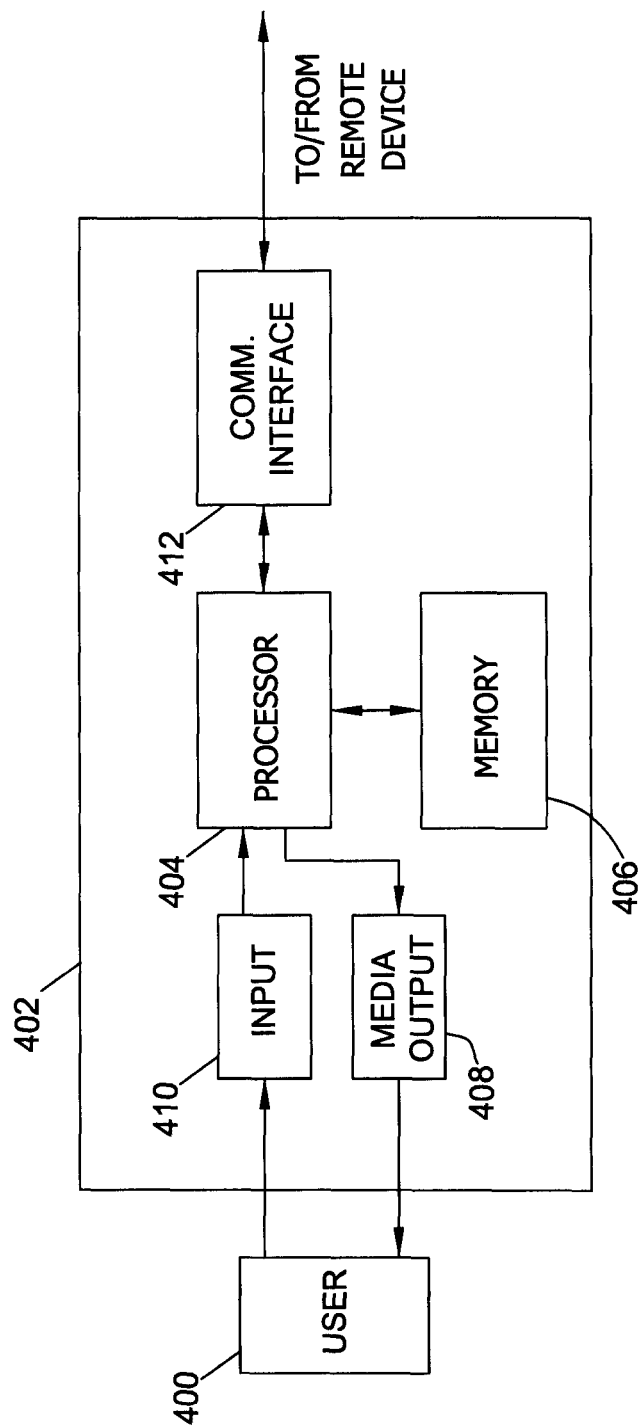

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400 (e.g., a cardholder 22). Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and a client application, facilitates display of nutritional information and analytics by HT computing device 112. The user may interact with the user interface to view and explore the analytics, for example, by selecting to view historical food consumption and/or historical nutritional information using input device 410 and viewing analytics associated with same.

Figure 5:
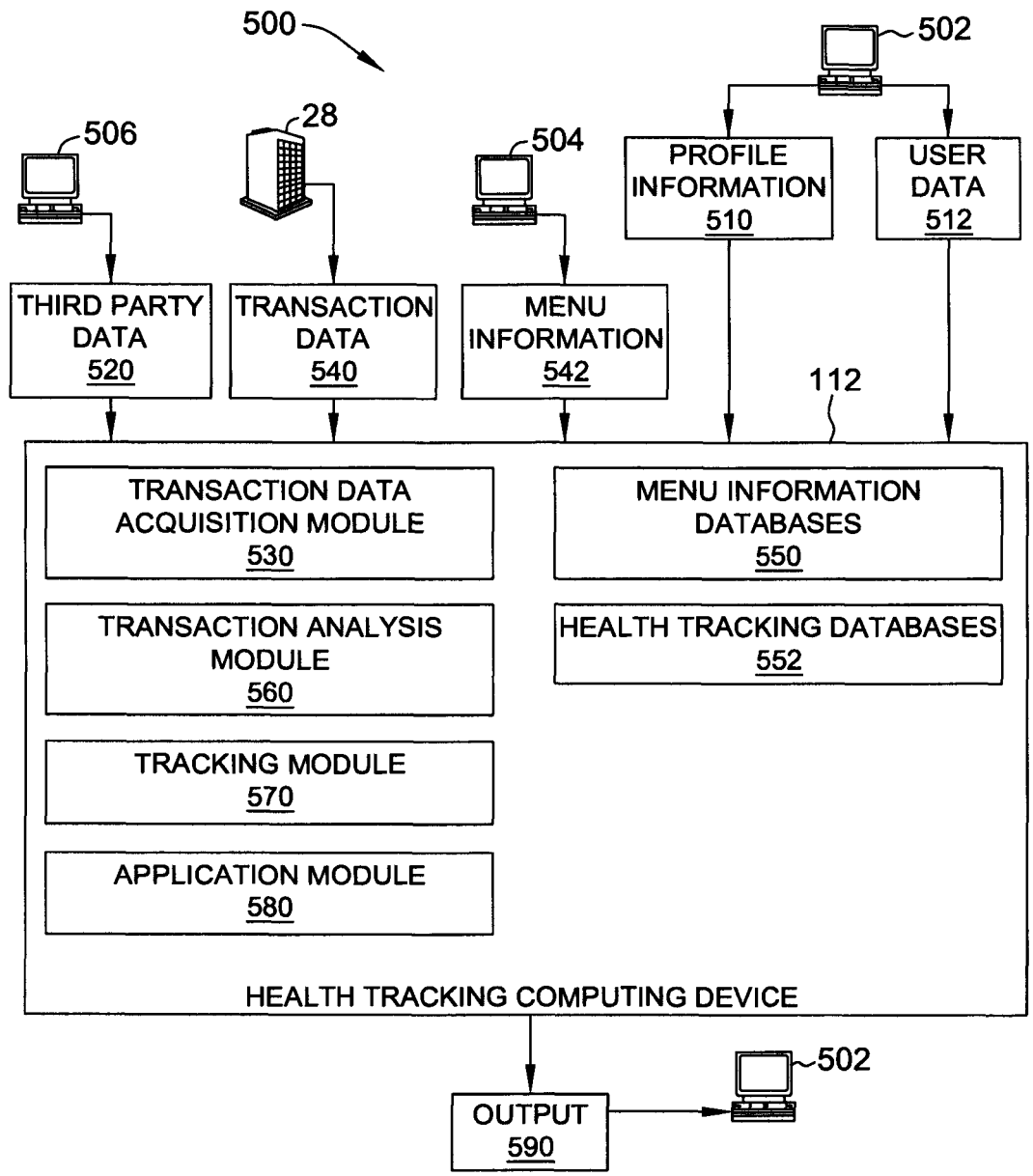

FIG. 5 is a data flow diagram showing the flow of data within the HT platform of FIG. 2 including calculation and tracking of nutritional information for a consumer using purchase data. As described herein, HT computing device 112 receives profile information 510 (i.e., a profile for a cardholder and profiles for individuals for whom the cardholder purchases food) and user data 512 (i.e., information on the cardholder) from a user device 502. In some embodiments, enrollment data includes user data 512 and/or profile information 510.

HT computing device 112 includes a plurality of health tracking data records in health tracking databases 552, where the health tracking data records include nutritional information for each profile. HT computing device 112 further includes menu information databases 550 that include merchant menu information, including the price and nutritional information associated with each food item available for purchase. HT computing device 112 also receives third party data 520 from user device remote computing device 506 (e.g., a computing device operated by an administrative user). Alternatively, HT computing device 112 receives third party data 520 directly from a user.

HT computing device 112 also receives transaction data 540 associated with a plurality of merchants being analyzed. In the example embodiment, transaction data 540 is received from interchange network 28 (shown in FIG. 1). HT computing device 112 identifies relevant merchants in transaction data 540 received from network 28 based on a merchant identifier. HT computing device 112 stores transaction data 540 or a part thereof in the database. Other information including menu information 542 data may be received from external systems such as external server 504. For example, HT computing device 112 may receive prices and nutritional information associated with each food item available for purchase by a merchant from external server 504 operated by the merchant.

HT computing device 112 includes a plurality of modules 530, 560, 570, and 580 that facilitate receiving transaction data from a network, identifying relevant cardholders and merchants from the transaction data, identifying food order combinations purchased by a cardholder or other individuals, determining the nutritional value of food purchased by the cardholder, tracking food consumption by the cardholder or the other individuals, generating analytics or other data, and displaying the data on an application. Specifically, HT computing device 112 includes transaction analysis module 560 configured to retrieve from the transaction data at least a transaction amount and a merchant location, and using the transaction amount and merchant location, transaction analysis module 560 determines the food order combination purchased in the transaction.

HT computing device 112 also includes tracking module 570 configured to track the eating habits of the cardholder. Tracking module 570 generates health tracking records in health tracking database 552. For example, the health tracking records may be stored with an identifier of the merchant, a transaction data timestamp, and/or other information. The nutritional information and/or additional information allows tracking module 570, or a user client system to which the information is provided, to track the eating habits of the cardholder and/or otherwise generate analytics based on the information. For example, transaction timestamp data may allow tracking module 570 to identify a meal for which the food items were purchased, the time between food consumption, restaurants which the cardholder frequents most often, and/or generate other information. Tracking module 570 further determines that a transaction amount for a selected signal likely corresponds to a food purchase made by the cardholder for more than one person.

HT computing device 112 also includes application module 580 configured to support the functionality of HT application 122 and transaction data acquisition module 530 configured to receive a plurality of transaction signals, each transaction signal including transaction data. The transaction data includes a cardholder identifier (e.g., a primary account number (PAN), payment card number, cardholder name, cardholder address, etc.). Transaction data acquisition module 530 determines if a transaction signal of the plurality of received transaction signals includes a cardholder identifier corresponding to a cardholder for whom HT computing device 112 is tracking the nutritional value of food purchases. For example, HT computing device 112 maintains a database of cardholder identifiers for cardholders participating in nutritional value tracking and compares cardholder identifiers in received transaction signals to this database. Upon identifying a match, the corresponding transaction signal is identified as a candidate signal. The candidate signal corresponds to a purchase made by a cardholder for whom the HT computing device is tracking the nutritional value of food purchases. Transaction data acquisition module 530 selects a candidate signal if the candidate signal further corresponds to a food purchase, such as a transaction corresponding to a purchase made at a restaurant or other food merchant. Transaction data acquisition module 530 retrieves a merchant identifier included in the transaction data of the candidate signal. Transaction data acquisition module 530 compares the retrieved merchant identifier to a database of merchant information including merchant identifiers. Transaction data acquisition module 530 retrieves merchant information from the database corresponding to a merchant identifier that matches the merchant identifier included in the transaction data of the candidate signal. Based on the retrieved merchant information, transaction data acquisition module 530 determines if the candidate signal corresponds with a food purchase made at a restaurant or other food merchant. If transaction data acquisition module 530 determines that the candidate signal corresponds with a food purchase made at a restaurant or other food merchant, the candidate signal is selected.

HT computing device 112 is also configured to provide outputs 590 as described herein. Outputs 590 may include nutritional information for each user, as well as analytics for each user. Outputs 590 may also include merchant recommendations, which may be sorted to identify and emphasize merchants that align with health goals of a user. Outputs 590 may also include any and all formatted output for display on a user interface of a user computing device (e.g., client system 114, as shown in FIG. 2). Outputs 590 may further include instructions generated by HT computing device 112 which, when received, cause user device 502 to display the nutritional information and the analytics for the user.

FIG. 6 is a simplified chart 600 illustrating data entries in an example menu information database for a merchant used by the HT computing device of FIG. 2. The chart 600 includes food type 602, serving size 604, protein content 606, carbohydrate content 608, fat content 610, nutritional points 612, calories 614, price 616, amount of protein per dollar 618, amount of carbohydrates per dollar 620, amount of fat per dollar 622, amount of nutritional points per dollar 624, and amount of calories per dollar 626. Alternative embodiments of the chart may include less or more nutritional information.

Figure 7:
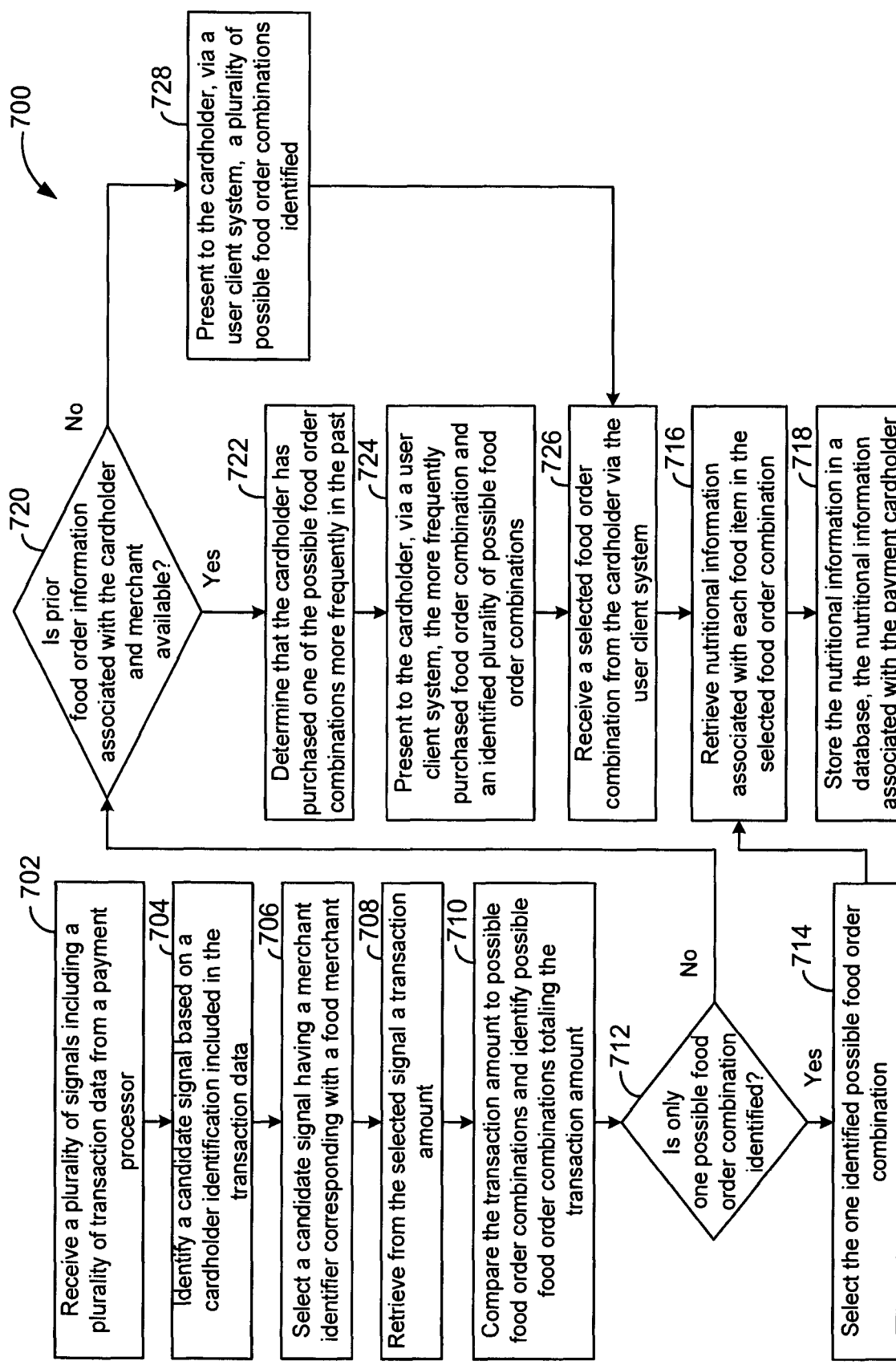

FIG. 7 is a simplified diagram of an example method 700 for calculating and tracking nutritional information using the HT computing device of FIG. 2. The HT computing device receives 702 a plurality of signals, including a plurality of transaction data from a payment processor. The HT computing device identifies 704 a candidate signal based on a cardholder identifier included in the transaction data. The HT computing device selects 706 the candidate signal having a merchant identifier corresponding with a food merchant. The HT computing device retrieves 708 from the selected signal a transaction amount. The HT computing device compares 710 the transaction amount to possible food order combinations and identifies possible food order combinations totaling the transaction amount.

If there is only one possible food order combination identified 712, the HT computing device selects 714 the one identified possible food order combination. The HT computing device retrieves 716 nutritional information associated with each food item in the selected food order combination. The BT computing device stores 718 the nutritional information in a database, the nutritional information associated with the payment cardholder.

If there is more than one possible food order combination identified 712, the HT computing device verifies 720 whether there is prior food order information associated with the cardholder and the merchant. If the prior food order information is available, the HT computing device determines 722 that the cardholder has purchased one of the possible food order combinations more frequently in the past. The HT computing device presents 724 to the cardholder, via a user client system, the more frequently purchased food order combination and an identified plurality of possible food order combinations. The HT computing device receives 726 a selected food order combination from the cardholder via the user client system. The HT computing device retrieves 716 nutritional information associated with each food item in the selected food order combination. The HT computing device stores 718 the nutritional information in a database, the nutritional information associated with the payment cardholder.

If prior food order information is not available, the HT computing device presents 728 to the cardholder, via the user client system, a plurality of possible food order combinations identified. In some embodiments, the HT computing device prompts the cardholder, via the user client system, to select the correct food order combination from the plurality of possible food order combinations identified.

Figure 8:
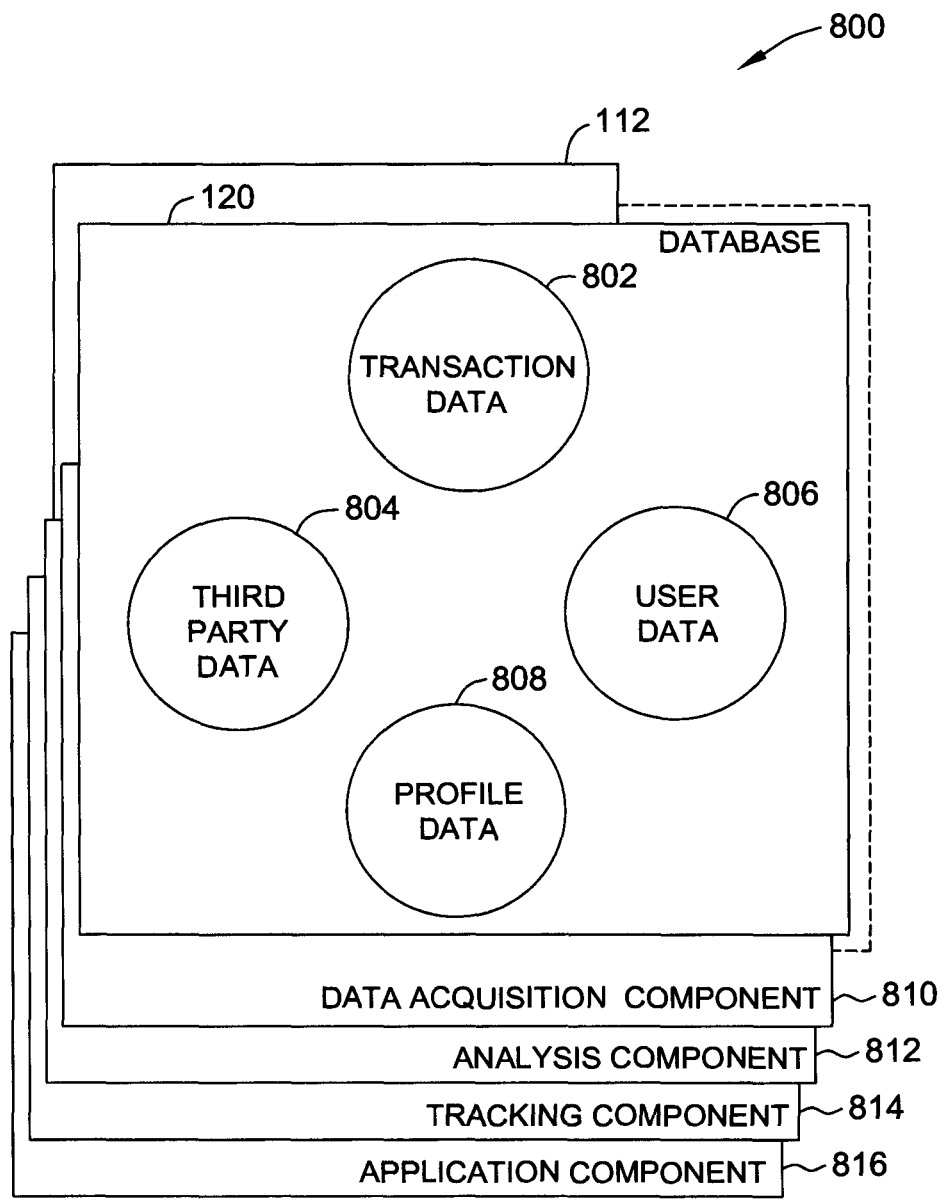

FIG. 8 is a diagram of components of one or more example computing devices that may be used in the environment shown in FIG. 2. Database 120 may store information such as, for example, transaction data 802, third party data 804, user data 806 (e.g., cardholder information and login information), profile data 808 (e.g., profile data such as nutritional history and analytics), and/or other data. Database 120 is coupled to several separate components within HT computing device 112, which perform specific tasks.

HT computing device 112 includes a data acquisition component 810 for receiving a plurality of transaction signals for transactions from a payment processing network and selecting a candidate signal, as described above. The transaction data is associated with a plurality of merchants. Analysis component 812 is used to determine the food combination sets and generate nutritional information and analytics for each user based on the transaction data associated with one or more merchants of the plurality of merchants. Analysis component 812 determines food items purchased in a transaction by, using the retrieved price information for each food item available for sale, comparing the transaction amount to a set of possible food order combinations that total the transaction amount. In an alternative embodiment, the HT computing device maintains a database of all possible combinations of food items below a certain threshold total price. Analysis component 812 compares the transaction price to the total price of each possible combination and retrieves matching combinations. Analysis component 812 may utilize other information in determining the set of possible food order combinations to account for differences between the price as listed on a merchant menu and/or the listed price plus sales tax and the actual price paid in the transaction between the cardholder and the merchant. For example, Analysis component 812 may account for discounts of coupons by querying an additional database of ongoing promotions associated with the merchant.

In some embodiments, analysis component 812 transmits a prompt to a user client system for additional information. For example, analysis component 812 transmits an instruction that causes an application running on the user client system to display the prompt. The prompt identifies the preliminarily selected food order combination and the alternative food order combinations returned by analysis component 812 and prompts the cardholder to confirm the preliminarily selected food order combination is correct or select from the alternative food order combinations. Analysis component 812 receives the selection from the cardholder via communication with the user client system.

Using the selected food order combination, analysis component 812 retrieves nutritional information corresponding to each food item in the selected food order combination. For example, analysis component 812 queries a local database (e.g., maintained by the HT computing device) or a remote database (e.g., maintained by the merchant) with identifiers of the food items in the selected food order combination. Analysis component 812 receives corresponding nutritional information from the database. Nutritional information may include calorie content, fat content, protein content, sugar content, and/or other nutritional information.

HT computing device 112 further includes tracking component 814 to track the eating habits of the cardholder and/or otherwise generate analytics based on the information. Nutritional information for an entire food order and/or corresponding food items is stored in a database. Tracking component 814 may store additional information with the nutritional information in the database. For example, the nutritional information may be stored with an identifier of the merchant, a transaction data timestamp, and/or other information. The nutritional information and/or additional information may allow tracking component 814, or a user client system to which the information is provided, to track the eating habits of the cardholder and/or otherwise generate analytics based on the information.

In some embodiments, tracking component 814 determines that a transaction amount for a selected signal likely corresponds to a food purchase made by the cardholder for more than one person. For example, tracking component 814 may compare the transaction amount to an average transaction amount associated with the merchant identified in the transaction data of the selected signal. If the transaction amount exceeds the average transaction amount by a predetermined value, tracking component 814 determines that the purchase was likely for multiple people. Upon determining that the selected signal likely corresponds to a food purchase made by the cardholder for more than one person, tracking component 814 prompts the cardholder to select which food items were consumed by the cardholder. In further embodiments, the prompt corresponding to a food purchase for more than one person includes a prompt for the cardholder to assign each food item to one or more profiles. Tracking component 814 may automatically assign food items to profiles based on historic information for that merchant indicating how food items have been assigned for past transactions.

In some implementations, tracking component 814 (or any other component of HT computing device 112) is further configured to calculate an average transaction amount for each merchant using received transaction data for the merchant. The average ticket size represents an average transaction amount for the merchant during a period of time, and the average ticket size may be calculated by dividing a total sales revenue by a number of transactions during the period of time.

HT computing device 112 further includes application component 816 to support HT application 122. In some embodiments, HT computing device 112 outputs nutritional information, recommendations, and/or analytics to an application (i.e., HT application 122) associated with the HT computing device running on a user client system or to a web server associated with the HT computing device. The HT computing device may further receive additional health information from the application entered directly or indirectly by a cardholder. For example, the HT computing device may receive activity information (e.g., calories burned in a day) from an activity tracker. The HT computing device may use received information in tracking the health of the cardholder and/or providing recommendations to the cardholder. In alternative embodiments, the HT computing device outputs nutritional information, recommendations, and/or analytics to a third party application, user client system, or service.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods enable allocating a minimum percentage of peak bandwidth to a priority class. More specifically, the systems and methods described herein provide determine peak bandwidth demand and allocate a minimum percentage of the peak bandwidth demand to a priority class.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for identifying items purchased at a merchant using a computing device including a processor in communication with a memory, said method comprising:
   receiving transaction data generated at a point-of-sale terminal upon initiation of a purchase transaction by a consumer, the transaction data including a transaction amount and a merchant identifier associated with the merchant;
   retrieving pre-tax price information for each item available for sale at the merchant;
   identifying, based on the merchant identifier, a location of the merchant;
   retrieving, based on the location of the merchant, tax information for a geographic region including the location of the merchant;
   calculating, based on the tax information and the transaction amount, a pre-tax total and a tax amount associated with the transaction;
   identifying, based on the pre-tax total and the pre-tax price information, a set of possible item combinations associated with the merchant totaling the pre-tax total;
   selecting a most likely item combination associated with the purchase transaction from the set of possible item combinations;
   transmitting an instruction to an application on a user client system associated with the consumer, wherein the instruction causes the application to present the selected most likely item combination on a display of the user client system;
   receiving, from the application on the user client system, a confirmation of an actual item combination included in the purchase transaction; and
   causing the application of the user client system to display analytics associated with the actual item combination, thereby enabling the consumer to view the analytics without having to manually input item data into the user client system.

2. The computer-implemented method of claim 1, wherein selecting the most likely item combination comprises:
   retrieving at least one previously selected item combination associated with the consumer totaling the transaction amount;
   determining a selection frequency for each possible item combination of the set of possible item combinations based on the at least one previously selected item combination; and
   selecting the most likely item combination based on the selection frequency.

3. The computer-implemented method of claim 1, wherein receiving the transaction data associated with the transaction comprises receiving the transaction data that does not include item-identifying data.

4. The computer-implemented method of claim 1, wherein identifying the set of possible item combinations associated with the merchant totaling the pre-tax total comprises determining, based on the price information, all possible combinations of items available at the merchant having prices that total the pre-tax total.

5. The computer-implemented method of claim 4, wherein selecting the most likely item combination comprises:
   retrieving at least one previously selected item combination associated with the consumer totaling the transaction amount;
   determining a selection frequency for each possible item combination of the set of possible item combinations based on the at least one previously selected item combination; and
   selecting the most likely item combination based on the selection frequency.

6. The computer-implemented method of claim 1 wherein the instruction further causes the application to present price information for each item in the most likely item combination, and the tax amount associated with the transaction.

7. A computing device for identifying items purchased at a merchant, said computing device comprising a processor in communication with a memory, said processor programmed to:
   receive transaction data generated at a point-of-sale terminal upon initiation of a purchase transaction by a consumer, the transaction data including a transaction amount and a merchant identifier associated with the merchant;
   retrieve pre-tax price information for each item available for sale at the merchant;
   identify, based on the merchant identifier, a location of the merchant;
   retrieve, based on the location of the merchant, tax information for a geographic region including the location of the merchant;
   calculate, based on the tax information and the transaction amount, a pre-tax total and a tax amount associated with the transaction;
   identify, based on the pre-tax total and the price information, a set of possible item combinations associated with the merchant totaling the pre-tax total;
   select a most likely item combination associated with the purchase transaction from the set of possible item combinations;
   transmit an instruction to an application on a user client system associated with the consumer, wherein the instruction causes the application to present the selected most likely item combination on a display of the user client system;
   receive, from the application on the user client system, a confirmation of an actual item combination included in the purchase transaction; and
   cause the application of the user client system to display analytics associated with the actual item combination, thereby enabling the consumer to view the analytics without having to manually input item data into the user client system.

8. The computing device of claim 7, wherein to select the most likely item combination, said processor is further programmed to:
   retrieve at least one previously selected item combination associated with the consumer totaling the transaction amount;
   determine a selection frequency for each possible item combination of the set of possible item combinations based on the at least one previously selected item combination; and
   select the most likely item combination based on the selection frequency.

9. The computing device of claim 7, wherein the transaction data does not include item-identifying data.

10. The computing device of claim 7, wherein, to identify the set of possible item combinations associated with the merchant totaling the pre-tax total, said processor is further programmed to determine, based on the price information, all possible combinations of items available at the merchant having prices that total the pre-tax total.

11. The computing device of claim 7, wherein the instruction further causes the application to present price information for each item in the most likely item combination, and the tax amount associated with the transaction.

12. Non-transitory computer-readable storage media having computer-executable instructions embodied thereon, wherein, when executed by at least one processor of computing device, the computer-executable instructions cause the processor to:
receive transaction data generated at a point-of-sale terminal upon initiation of a purchase transaction by a consumer, the transaction data including a transaction amount and a merchant identifier associated with the merchant;
retrieve pre-tax price information for each item available for sale at the merchant;
identify, based on the merchant identifier, a location of the merchant;
retrieve, based on the location of the merchant, tax information for a geographic region including the location of the merchant;
calculate, based on the tax information and the transaction amount, a pre-tax total and a tax amount associated with the transaction;
identify, based on the pre-tax total and the price information, a set of possible item combinations associated with the merchant totaling the pre-tax total;
select a most likely item combination associated with the purchase transaction from the set of possible item combinations;
transmit an instruction to an application on a user client system associated with the consumer, wherein the instruction causes the application to present the selected most likely item combination on a display of the user client system;
receive, from the application on the user client system, a confirmation of an actual item combination included in the purchase transaction; and
cause the application of the user client system to display analytics associated with the actual item combination, thereby enabling the consumer to view the analytics without having to manually input item data into the user client system.

13. The non-transitory computer-readable storage media of claim 12, wherein to select the most likely item combination, the computer-executable instructions further cause the processor to:
retrieve at least one previously selected item combination associated with the consumer totaling the transaction amount;
determine a selection frequency for each possible item combination of the set of possible item combinations based on the at least one previously selected item combination; and
select the most likely item combination based on the selection frequency.

14. The non-transitory computer-readable storage media of claim 12, wherein the transaction data does not include item-identifying data.

15. The non-transitory computer-readable storage media of claim 12, wherein, to identify the set of possible item combinations associated with the merchant totaling the pre-tax total, the computer-executable instructions further cause the processor to determine, based on the price information, all possible combinations of items available at the merchant having prices that total the pre-tax total.

16. The non-transitory computer-readable storage media of claim 12, wherein the instruction further causes the application to present price information for each item in the most likely item combination, and the tax amount associated with the transaction.

* * * * *